United States Patent [19]

Yacus

[11] 4,205,624
[45] Jun. 3, 1980

[54] METHOD AND EQUIPMENT FOR SANITIZING ANIMAL SOILED RUBBER BEDDING MATERIAL

[76] Inventor: Steve Yacus, 150 Washington Valley Rd., Warren, N.J. 07060

[21] Appl. No.: 924,687

[22] Filed: Jul. 14, 1978

[51] Int. Cl.² .................. A01K 1/015; B08B 3/04
[52] U.S. Cl. ........................................ 119/1; 134/30; 134/104; 209/10
[58] Field of Search ............... 119/1, 28; 134/63, 104, 134/25 R, 30, 32; 15/302, 3.11; 34/164; 209/10

[56] References Cited

U.S. PATENT DOCUMENTS

| | | | |
|---|---|---|---|
| 2,633,171 | 3/1953 | Daman | 34/164 X |
| 3,216,344 | 11/1965 | Beagle | 34/164 X |
| 3,765,371 | 10/1973 | Fisher | 119/1 |
| 3,853,622 | 12/1974 | Rutten | 134/25 R |
| 4,038,944 | 8/1977 | Tucci | 119/28 X |
| 4,134,556 | 1/1979 | Ehrlich et al. | 241/DIG. 31 X |

*Primary Examiner*—Hugh R. Chamblee

*Attorney, Agent, or Firm*—Frederick W. Padden

[57] ABSTRACT

This specification discloses a procedure and facilities for removing animal excretions from rubber particles used as stall bedding material for animals, such as horses. The procedure involves vacuuming the bedding material into a drum container and then wheeling and securing the filled container onto a skip-hoist of the sanitizing equipment. The hoist raises the container and deposits its contents into a holding hopper from which they are fed through a meter at a uniform rate onto an orbiting screener. The orbit movement and orientation of the screener segregates the animal excretions and hay from the rubber particles. The latter are steam cleaned and then fed onto a leaf-type vibrating screener for drying, sanitizing and insecticide spray coating. The sanitized particles are next vibratorily moved off the screener into a collecting drum. Waste extracted from the two screeners is conveyed onto an inclined platform for migration toward a waste collector.

9 Claims, 1 Drawing Figure

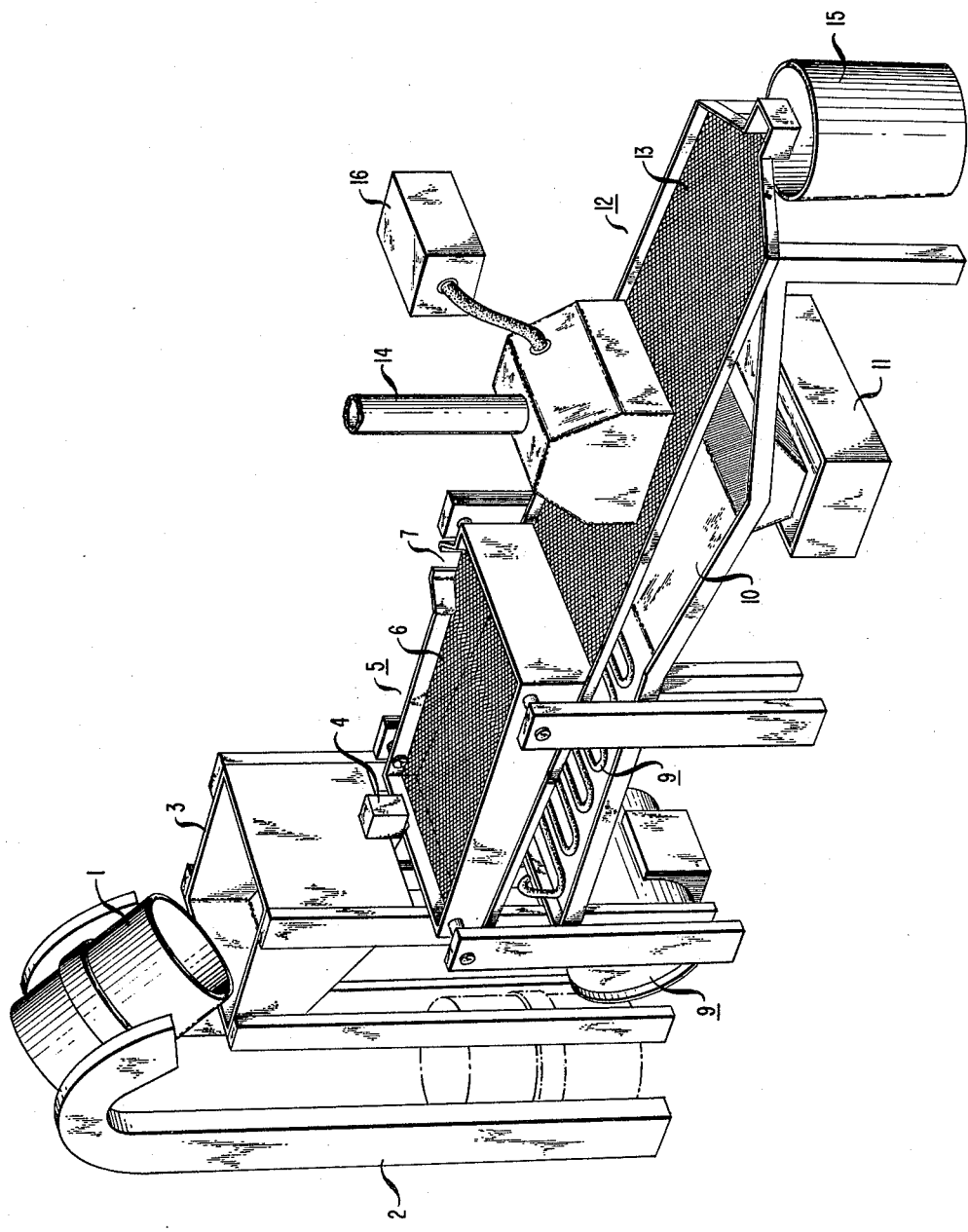

METHOD AND EQUIPMENT FOR SANITIZING ANIMAL SOILED RUBBER BEDDING MATERIAL

TECHNICAL FIELD

This invention relates to a method and equipment for removing waste material from rubber particles and particularly for sanitizing soiled rubber particles utilized as a bedding material for animals such as horses.

BACKGROUND ART

Concern for natural resources and environment has, in recent years, stimulated numerous projects to recycle used products for other beneficial uses. The projects have resulted, for example, in the recycling of used automobile tires into a number of specialty rubber products.

One such product has been the reclaiming of particle-size rubber for use as a bedding material for animals, such as horses. The rubber particles are referred to as crumb rubber and each is approximately ⅜ to ¼ inch in size and, illustratively, rectangular in shape. Typical bedding applications involve a 4 to 5 inch bed of the crumb rubber on the stable floor. Prototype uses of the rubber particles as a bedding material have revealed that it has a beneficial therapeutic effect on limbs of animals, such as horses.

Despite the benefits and prospective increased demand for the recycled tire rubber as a bedding material, it has heretofore been a persistent problem to reuse it after it has been soiled by animal excretions. Heretofore, the soiled rubber has presented a health hazard because it could not readily be efficiently and economically sanitized and reused. Resultingly, it had to be discarded.

A need has therefore existed for a procedure and equipment for efficiently and economically sanitizing rubber particles after they had been soiled by animal excretions.

DISCLOSURE OF THE INVENTION

The foregoing problem is solved and a technical advance is achieved by a method and equipment for processing soiled rubber particles to sanitize them for reuse as an animal bedding material. The sanitizing process is particularly useful in cleansing soiled rubber particles and separating them from hay and animal wastes in the bedding of horse stalls.

An illustrative embodiment provides for the vacuuming of soiled bedding material, including the rubber particles into a drum container. The latter is then wheeled to and secured to a skip-hoist of the sanitizing equipment. A person then manually activates the sanitizing equipment including the hoist to raise the filled drum from ground level to an elevated and rotated position for depositing the soiled bedding material into a holding hopper. The remainder of the sanitizing operations are thereafter automatically completed.

The automatic operations include the dispensing of soiled rubber particles, hay and solid animal excretions at a substantially uniform rate from the hopper through a rate meter onto an orbitally gyrating screener. The orbital movement of the screener segregates the hay and solid waste from the rubber particles and expels them from an inclined screen into a disposal unit while droppingly urging the rubber particles, by sifting action, through the deck of the orbitally gyrating screen onto a leaf-type vibratory screener. During the urging procedure, and while the rubber particles are on the gyrating or vibratory screener, a steam substance is projected through the mesh of the inclined screen from a steam cleaning apparatus for cleansing the particles and precipitating the soil residue through the screen mesh onto an inclined platform to a waste collector.

On the leaf-type screener which is functionally mounted independent of the orbital screener, the clean rubber particles are dried by the vibratory movement and by an application of heat from a heat source. Further waste is sifted through the mesh of a screen of the vibratory screener onto the inclined platform for entry into the waste collector. Concurrently, the sanitized rubber particles are coated with an insecticide as a repellant for insects, such as horse flies. The vibratory action of the screener further causes the dried and coated rubber particles to migrate and be collected in a collecting drum for return to an animal stall as a bedding material.

An alternate method of dry cleaning the sifted rubber particles is by spraying the rubber with a sanitizing chemical which destroys bacteria and odor. The rubber is also dried suitably by mixing drying materials (such as corn cob) with the rubber particles to absorb in the drying material any residual moisture in the rubber and then screening out the drying material and recycling the "wet" material for drying and reuse in a closed loop system.

The waste and hay segregated from the rubber particles on the orbital screener are suitably dried and bagged for reuse, for example, as a soil ingredient.

DRAWING DESCRIPTION

The foregoing features and advantages and others of this invention can be more fully understood by a reading of the following description with reference to the single sheet of drawing which illustrates an exemplary equipment for processing soiled animal bedding material to effect its sanitation.

DETAILED DESCRIPTION

In the drawing, a standard 55 gallon drum 1 is shown mounted on a skip hoist 2. Drum 1 contains the soiled animal bedding material gathered, for example, from a horse stall. The material advantageously contains the shredded crumb rubber particles, each of which is approximately ⅜ inch in size, as well as hay and horse excretion and urine. The shape of the rubber particles is illustratively dimensionally rectangular with irregular surfaces approximating crumbs. In its soiled state, the rubber particles have a generally brownish color.

Loading of the soiled material into drum 1 is advantageously by means of a vacuum device (not shown) which lifts the material into drum 1. The loaded drum is then moved illustratively by means of a wheeled "dolly" (not shown) from the horse stall to a secured position on hoist 2 at ground level as shown in the drawing.

Hoist 2 is a power-driven device which is manually activated for automatically raising the loaded drum 1 from the ground level position to an elevated and rotated position for dumping the soiled material into a hopper 3 and thereafter returning it to ground level. Before further describing the process and equipment of the drawing, it is advantageous to explain that it is within the purview of this invention to utilize other devices for entering the soiled material into the hopper 3. Such devices include the vacuum blower for direct placement of the soiled material from the stall to the hopper and an inclined conveyor and worm feed arrangements (not shown).

The soiled material is next fed at a uniform rate from its deposited location in the holding hopper 3 through a rate meter 4 onto an orbital screener 5. An orbital screener 5 rather than a leaf-type vibrating screener device has been found desirable to preclude bouncing and flipping of straw and solid animal waste and its projection through a screen 6 of screener 5. The orbital action of screener 5 moves the soiled material for effecting a separation of the straw and solid waste from the rubber particles. Orbital movement of the screener 5 causes the straw and solid horse excretion to migrate away from the rubber particles to an exit shute 7 for disposal.

Screen 6 is equipped with, for example, a wire mesh defining openings which allow the rubber particles to drop through the mesh by orbital sifting action on the vibratory screener 12. An amount of smaller hay and waste material are also sifted through the mesh of screen 6, but the vast proportion of the hay and waste are separated out through exit shute 7. The hay initially becomes deposited in the rubber bedding by the feeding and eating of the horse in its stall.

While the rubber particles are in transit from screen 6 to a screen 13 of screener 12 and/or while they are vibratorily moved on screen 13, they are subjected to steam cleaning from the steam apparatus 9 positioned below the wire screen 13. The steam projects upward through screen 13 and effects a cleansing of waste from the rubber particles while causing the waste to precipitate and flow downward through the mesh of screen 13 and thence to gravitate on the inclined platform 10 to a waste collector 11. As a result of the steam cleaning, the crumb rubber particles are cleansed of waste and revert from their brownish color virtually to their black color.

While the particles are being vibratorily moved on screener 12, moisture and other debris are expelled through the mesh of a screen 13 for movement downwardly on the inclined platform 10 to the waste collector 11. The mesh of screen 13 defines openings smaller in size than the size of the crumb rubber particles.

Dry, rather than wet, particles have been found to be more desirable and beneficial as a bedding material for horses. Therefore, the rubber particles on screen 13 are subjected to heat, illustratively, from a hot air machine 14 for drying residual moisture which may remain as they are vibratorily moved on the inclined screen 13 downwardly to a collecting 55 gallon drum 15. Other types of drying apparatus, such as drying lamps, are suitable for use in the drying operations.

At about the same time that the drying occurs, an insecticide is sprayed illustratively from a spray fogger 16 onto the drying rubber particles to act as a repellant to insects, such as flies, in the horse stall.

Upon completion of the foregoing sanitizing functions, the rubber particles in drum 15 are in a condition for reuse in a horse stall.

It is to be understood that the hereinbefore described arrangements are illustrative of the application of principles of my invention. In light of this teaching, it is apparent that numerous other arrangements may be devised by those skilled in the art without departing from the spirit and scope of the invention. For example, the materials such as crushed walnut shells, corn cobs or such materials other than rubber particles are suitable for bedding materials and are cleaned, sanitized, dried and insecticided as described. Moreover, the drying operation of the process is advantageously performed by commingling the steam cleaned rubber particles with a corn cob mixture in a closed recirculating loop. Such a commingling action in a vibratory environment causes the corn cob mixture to absorb and scrub dry the rubber particles. The dried particles are then separated from the corn cob mixture by a vibrating screening action and are deposited in a collecting drum. Another advantageous arrangement is to dry clean the rubber particles with a chemical solution instead of the steam cleaning step.

The following equipment elements are illustratively suitable for use with the invention:

Skip Hoist 2 - METPAR MODEL DSH 50 Metal Parts Processing Co. 165 Delancy Street Newark, New Jersey 07105

Orbiting Screener 5 - METPAR MODEL OS24 Metal Parts Processing Co. 165 Delancy Street Newark, New Jersey 07105

Vibratory Screener 12 - METPAR MODEL VS25 Metal Parts Processing Co. 165 Delancy Street Newark, New Jersey 07105

Insecticide Spray-Fogger - F982 Burgess Thermo-Fogger Puritan Chemical Co. Atlanta, Georgia 30318 or Dyna-Fog D#90 Chemical Fog Applicator Curtis Dyna Products Westfield, Indiana 46074

What is claimed is:

1. A method of automatically segregating bedding particles from hay and animal excretions and sanitizing the particles for reuse as an animal bedding material CHARACTERIZED BY gyrating on a screener a mixture of soiled bedding particles, hay and animal excretions for segregating said soiled bedding particles from said hay and excretions by passing the soiled bedding particles through a mesh of said screener, applying a steam cleaner from a steam cleaner apparatus to the segregated soiled particles for sanitizing said particles of animal excretions, and drying the sanitized particles on a vibratory screener.

2. The invention of claim 1 in which said bedding particles comprise rubber particles and further CHARACTERIZED BY depositing said mixture of soiled rubber particles, hay and animal excretions in a holding hopper, and feeding the deposited mixture from said hopper through a meter device at a uniform rate onto said gyrating screener.

3. The invention of claim 2 further CHARACTERIZED BY vacuuming said mixture of soiled rubber particles, hay and animal excretions into a drum container, hoisting said drum container to an elevated position for depositing said mixture vacuumed therein into said holding hopper.

4. A method of segregating bedding particles from hay and animal excretions and sanitizing the particles for reuse as an animal bedding material CHARACTERIZED BY gyrating on a screener a mixture of soil bedding particles, hay and animal excretions for segregating said hay and excretions, applying a steam cleaner from a steam cleaner apparatus to the soiled particles for sanitizing said particles of animal excretions, and drying the sanitized particles on a vibratory screener, said bedding particles comprise rubber particles, and further CHARACTERIZED BY sifting the rubber particles through a mesh of said gyrating screener onto said vibratory screener, and in which said steam cleaner from said apparatus is applied to said soiled rubber particles on said vibratory screener.

5. The invention of claim 4 further CHARACTERIZED BY conveying the mixture of soiled rubber particles, hay and animal excretions on an inclined conveyor into a holding hopper, and feeding the conveyed mixture from said hopper onto said gyrating screener.

6. The invention of claim 4 further CHARACTERIZED BY conveying the soil waste from the steam cleaned sanitized rubber particles through said vibratory screener and an inclined platform to a waste collector.

7. The invention of claim 6 in which said drying is CHARACTERIZED BY applying heat to said rubber particles on said vibratory screener.

8. The invention of claim 6 in which said drying is CHARACTERIZED BY mixing said steam cleaned sanitized rubber particles with a drying material for absorbing moisture therefrom, and thereafter separating the drying material from the dried rubber particles.

9. The invention of claim 5 further CHARACTERIZED BY coating an insecticide material on the dried sanitized rubber particles on said vibratory screener, and extracting the coated dried sanitized rubber particles into a collecting container for reuse as an animal bedding material.

* * * * *